March 28, 1939.  R. W. CONE  2,152,029
AIRPLANE WING CONSTRUCTION
Original Filed May 28, 1936   5 Sheets-Sheet 1
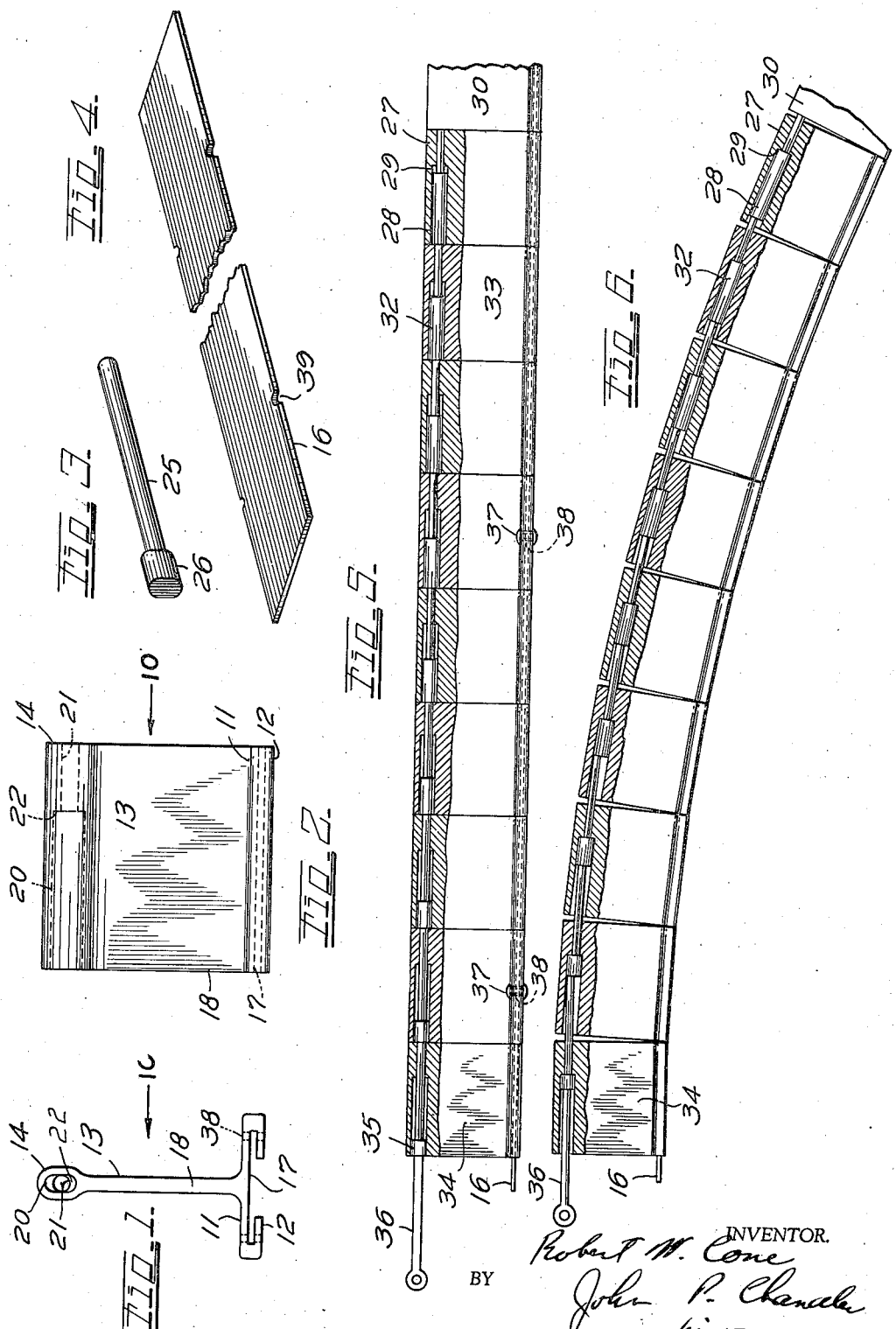
INVENTOR.
Robert W. Cone
BY John P. Chandler
his ATTORNEY.

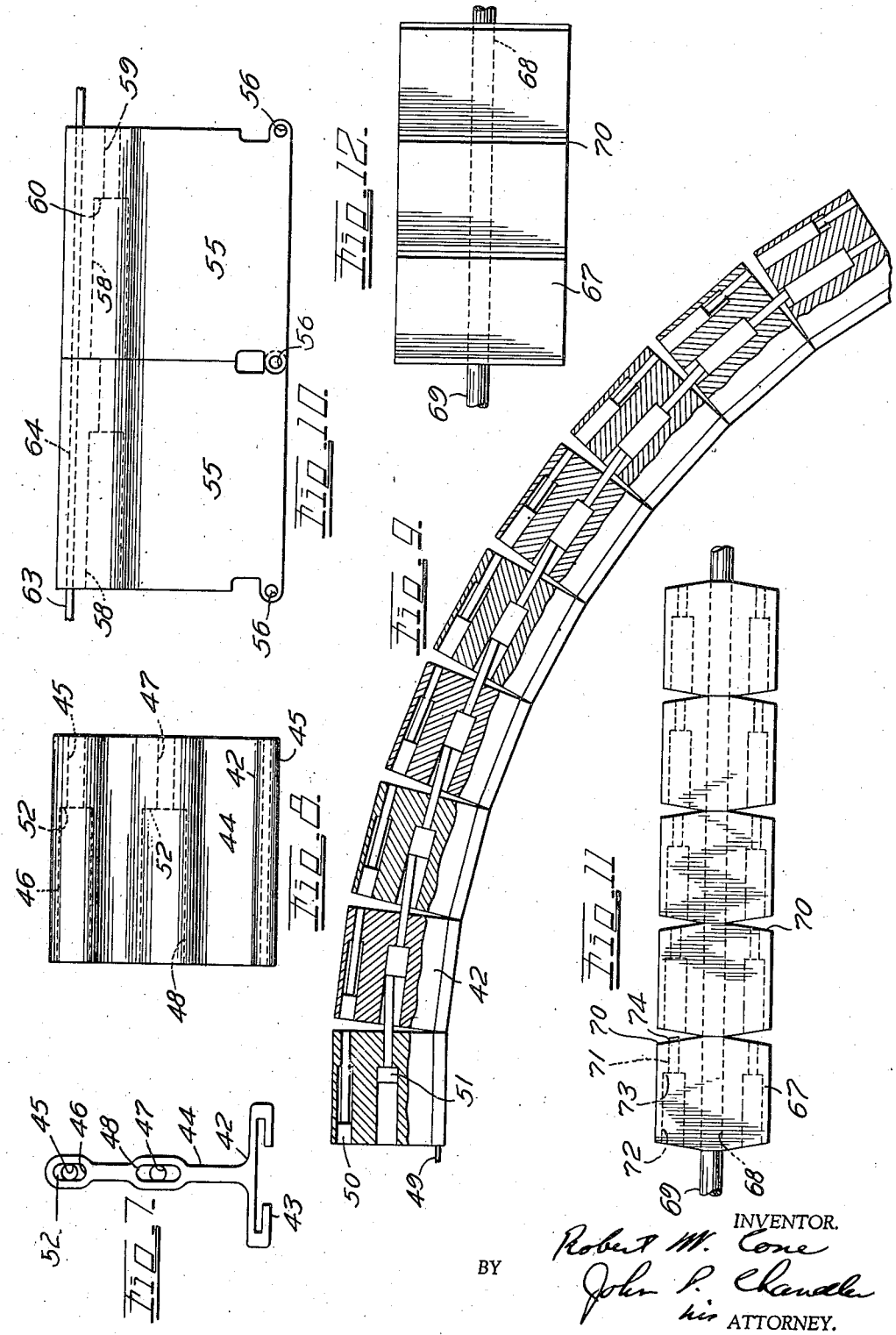

March 28, 1939.  R. W. CONE  2,152,029
AIRPLANE WING CONSTRUCTION
Original Filed May 28, 1936   5 Sheets-Sheet 3
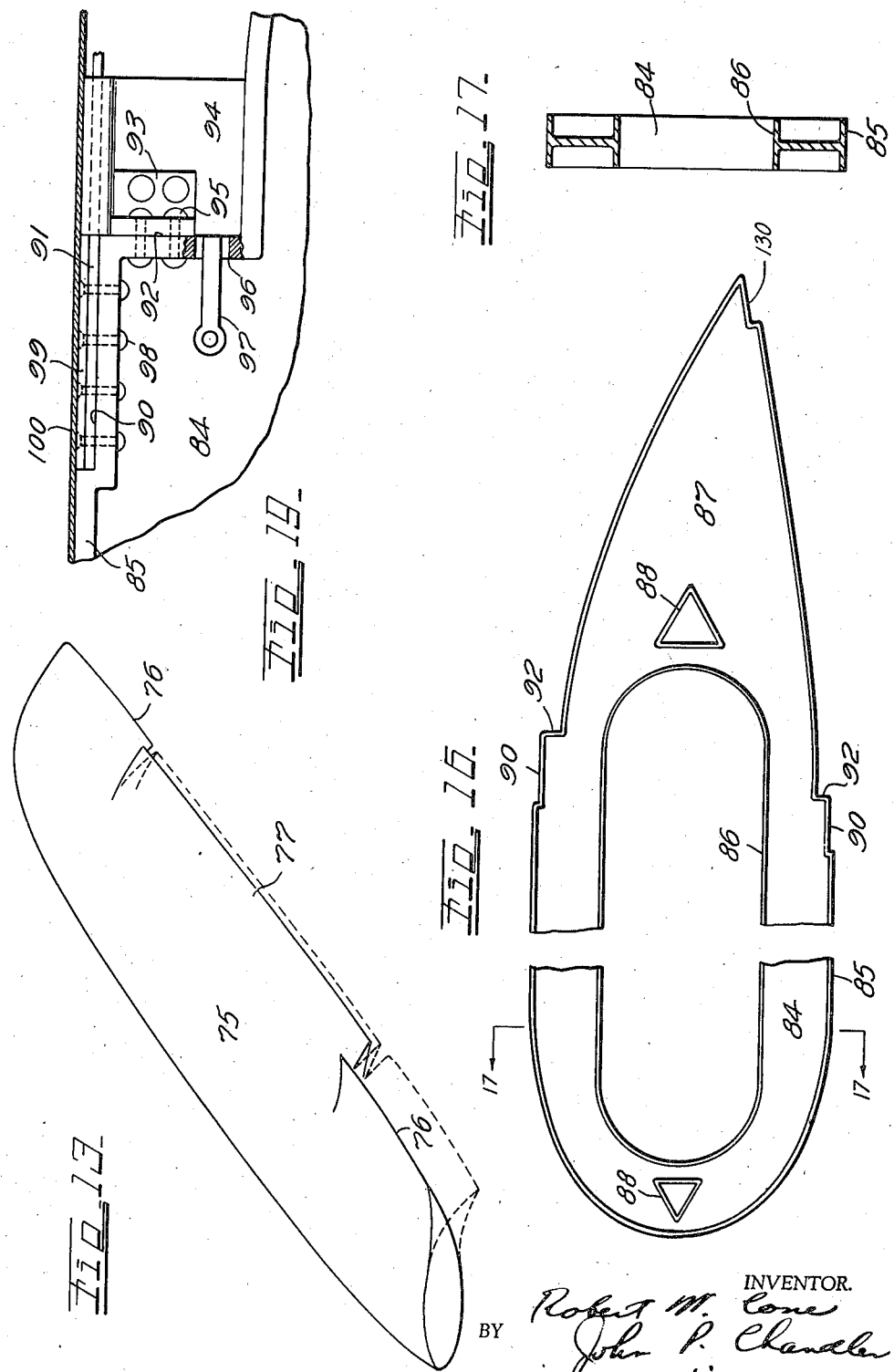
INVENTOR.
Robert W. Cone
BY John P. Chandler
his ATTORNEY.

March 28, 1939. R. W. CONE 2,152,029
AIRPLANE WING CONSTRUCTION
Original Filed May 28, 1936 5 Sheets-Sheet 4
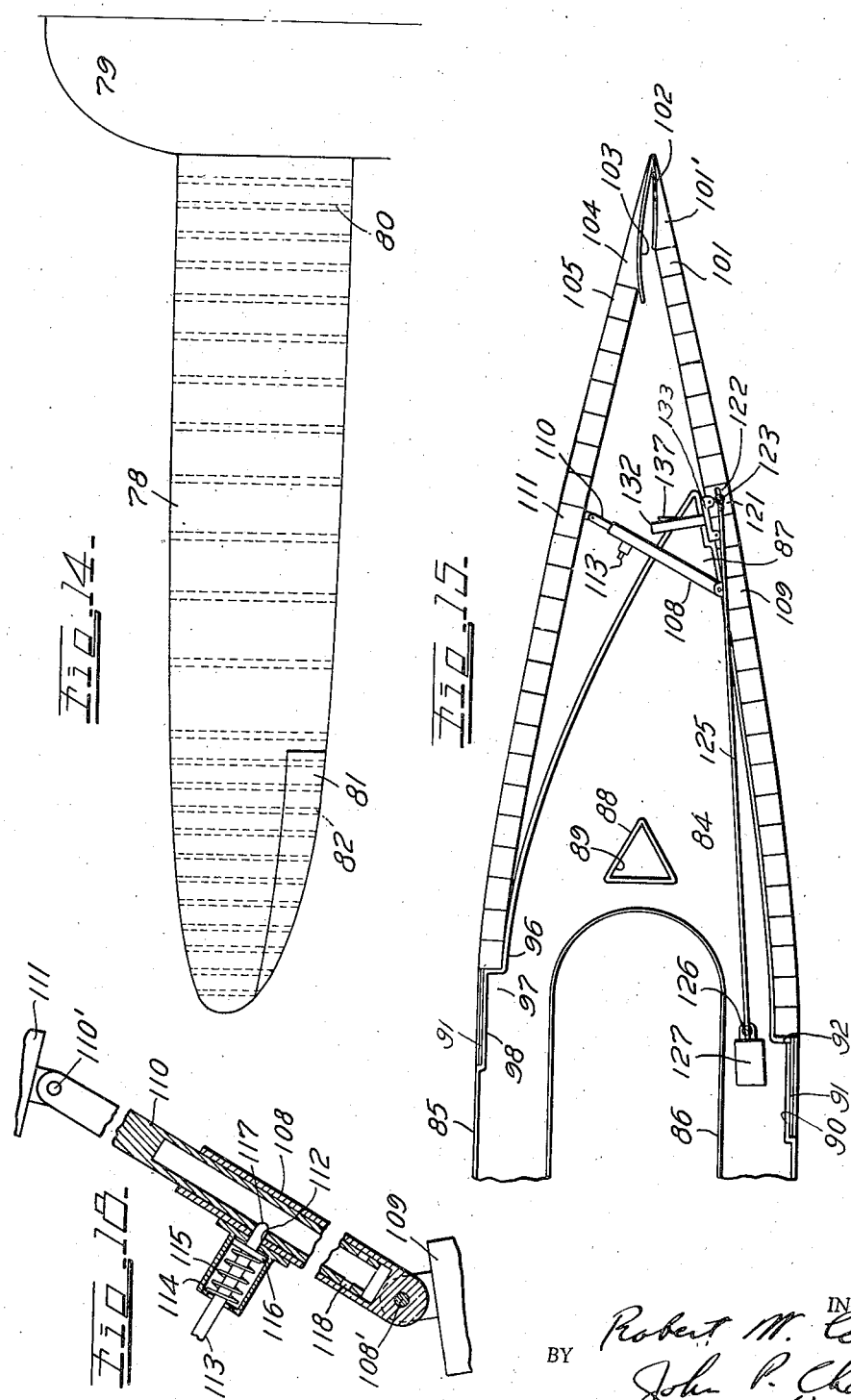
INVENTOR
Robert W. Cone
BY John P. Chandler
his ATTORNEY.

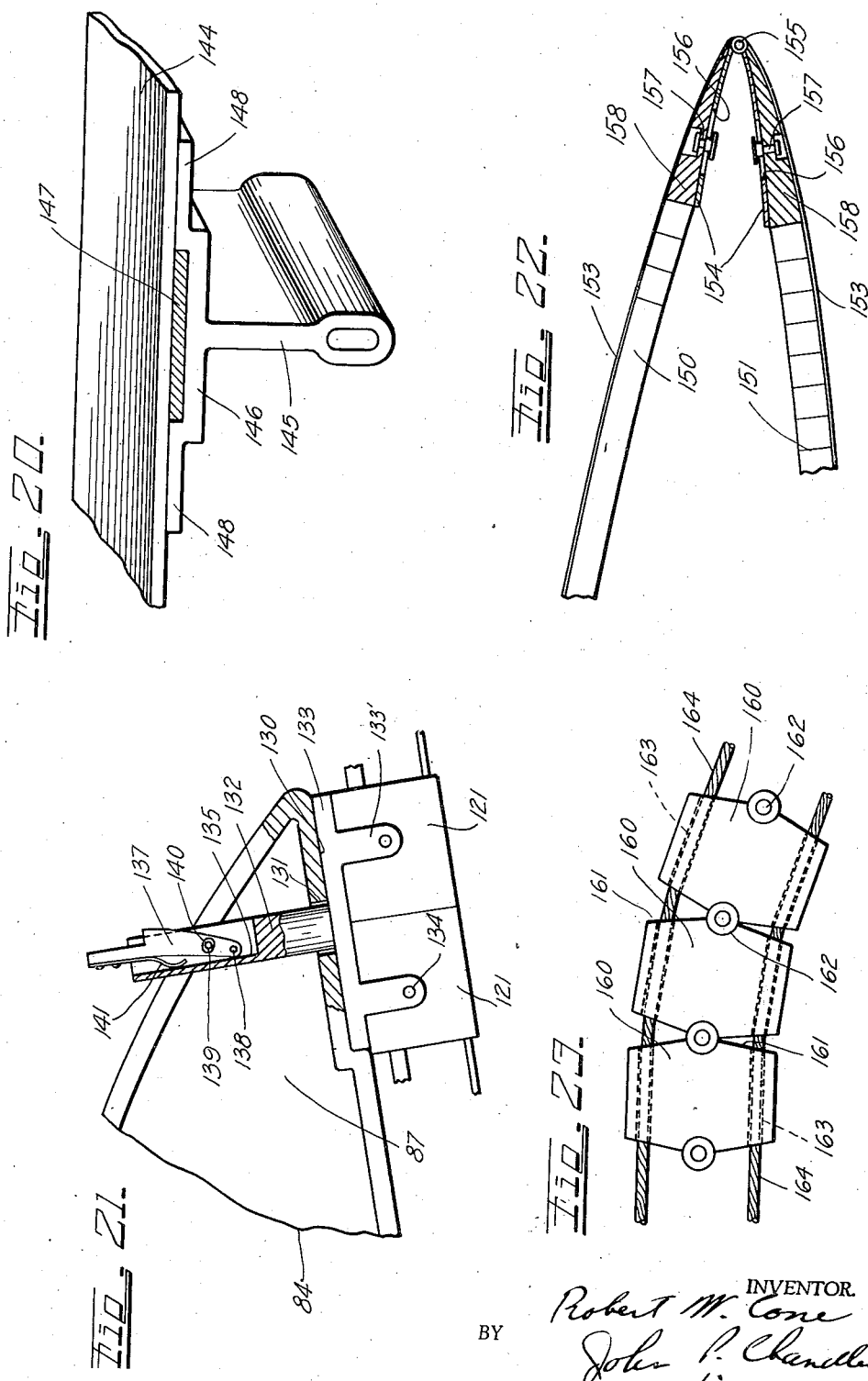

Patented Mar. 28, 1939

2,152,029

UNITED STATES PATENT OFFICE 2,152,029

AIRPLANE WING CONSTRUCTION

Robert W. Cone, Deal, N. J.

Application May 28, 1936, Serial No. 82,174
Renewed August 19, 1938

12 Claims. (Cl. 244—44)

This invention relates to improvements in airplane wing construction and relates more specifically to an improved wing, the camber of the upper and lower surfaces of which, as well as the thickness of which, may be varied over a considerable range and while the plane is in flight.

There exists among aeronautical engineers and designers of aircraft a considerable diversity of opinion as to what particular type of wing is most effective for any specific type of ship. As yet, there has not been developed any mathematical formula or process by which an airfoil possessing specified qualities can be designed, notwithstanding the fact that considerable work has been done along this line. The more usual method of designing an airfoil is to draw a section having a fair appearance and then testing it in a wind tunnel. Thereafter, modifications may be made to improve a section which has shown good results in the earlier tests.

The designer of an aircraft is desirous of providing an airfoil which will give the lowest landing speed for a given wing area, the greatest speed once normal flying altitude has been reached, the best rate of climb, and a minimum of structural weight and parisite resistance. There are, of course, other desirable qualities, but these constitute the most important.

One specific type of wing may excel in one of these qualities and another wing in another. It is fairly certain, however, and almost elementary, that no one specific wing formation will excel in all of these and other desirable characteristics, and it is accordingly one of the principal objects of the present invention to provide a wing, the camber of the upper and lower surfaces of which may be varied during flight with a minimum of effort by the aviator. In other words, if one wing is designed to give the greatest drag for slow landing, another the greatest lift for a short take-off, another the highest speed for sustained flight after altitude has been reached, the instant invention will provide means for successively altering the contour and thickness of the wing to provide the maximum efficiency at any given time or for any specific purpose.

Various flaps for the trailing edge of the airfoil have been devised to provide greater lift and drag but these have virtually all been pivoted or hinged members which are effective in only a small measure compared to their possible efficiency if the larger portion of the wing surface assumed a different curvature.

Inasmuch as the wing supports the weight of the plane by its reaction on the air, it must necessarily be of strong and rigid construction, particularly over the area adjacent to the leading edge where the heavy local loading occurs. The trailing edge is not so important as the load carrying member and accordingly the presently preferred airfoil constructed in accordance with the instant invention includes a rigid construction at the leading edge and extending over approximately one-third of the length of the chord of the wing. The upper and lower surfaces, particularly the latter, of the wing are constructed in such a manner as to be varied in contour and curvature at the will of the pilot, the wing surfaces being rigidly maintained in the desired curved plane by novel mechanical means hereinafter described.

It has been found recently that for sustained flight the most effective airfoil is relatively thick and is shaped generally like a dewdrop, the lower surface being only slightly less cambered, if any, than the upper surface. A thick airfoil is easier to brace and carry loads and has the further advantage that it compares favorably with thin sections for low drag at small angles of attack. Furthermore, it permits a reduction in parasite resistance by providing sufficient depth to house the structure in the wing.

It is virtually impossible to take off under a full load at a reasonable speed with such an airfoil because of the much lower degree of drag and lift. Landing at low speeds is likewise out of the question. Accordingly, it is an object of the present invention to provide means for lowering the entire trailing edge of the wing in a uniform, predetermined arc when the plane is taking off. For landing, means are provided for lowering the trailing edge of the lower surface only of the wing, thereby separating the upper from the lower trailing edges and producing a considerable suction in addition to the expected increase in drag.

Another object of the present invention is the provision of improved ailerons, rudders and elevators for airplanes. For some time it has been the practice to make each one of these three sets of control surfaces as moveable parts of a fixed surface, whereas in the earlier planes the elevators, rudders and ailerons were made as separate airfoils, moveable about a given axis. By hinging them to a fixed surface and making them moveable parts thereof, the same control forces could be obtained with less effort than if a single moveable surface were employed. In each instance, however, the flat or curved surface of the hinged member retained its original contour regardless of its position relative to the fixed surface. In the present invention, the aileron, rudder or elevator, instead of moving upon a single pivot, are, in effect, provided with a plurality of hinges in much the same fashion as a dog's tail, thereby causing the entire surface of the member to assume a geometrical curve of such character as to meet any specific requirements.

Another object of the invention is the provision of an improved streamlined control surface such as a rudder for use in the control mediums such as water, the member having a dual control mechanism permitting it to swing in an arcuate path on either side of the center.

Yet another object of the invention is the provision of an improved mechanical movement for controlling the configuration or contour of a flexible surface and to cause it to assume any predetermined curve. A still further object of the invention is the provision of improved means for controlling the movement of a flexible elongated member capable of movement in two planes.

In the drawings:

Fig. 1 is an end elevation of one of the individual flexion units or blocks;

Fig. 2 is a side elevation thereof;

Fig. 3 is a perspective view of one of the pins or plungers;

Fig. 4 is a broken perspective view of the spring tie rod;

Fig. 5 is a side elevation, partially in section, of the aligned flexion units in normal position;

Fig. 6 is similar to Fig. 5 but shows the assembly in curved position;

Fig. 7 is an end elevation of a modified form of the individual block;

Fig. 8 is a side elevation thereof;

Fig. 9 is a side elevation, partially in section, of the modified flexion assembly in a curved or arcuate position;

Fig. 10 is a side elevation of a plurality of the aligned flexion units in a second modified form;

Fig. 11 is a top plan view of a flexion assembly which is adapted to be curved in two planes;

Fig. 12 is a side elevation thereof;

Fig. 13 is a perspective view of an airfoil constructed in accordance with the present invention, the view showing in broken lines the several positions which the trailing edge and aileron section may assume;

Fig. 14 is a top plan view of half a wing section, the view showing in broken lines the relative positions of the individual flexion assemblies;

Fig. 15 is a broken side elevation of a transverse supporting rib, the view also showing the upper and lower flexion assemblies and control means therefor;

Fig. 16 is a broken side elevation of the rib;

Fig. 17 is a section taken on line 17—17 of Fig. 16;

Fig. 18 is a broken longitudinal section of the telescopic tie rod structure for providing connection between the upper and lower wing surfaces;

Fig. 19 is a broken side elevation of the preferred means for securing the flexion assembly to the rib;

Fig. 20 is a broken side elevation of the preferred means for effecting support between the lower wing and the rib when the former is in a downward position;

Fig. 21 is a broken perspective view of the means for effecting support between the individual flexion assemblies;

Fig. 22 is a broken side elevation, partly in section, of an aileron section; and Fig. 23 is a side elevation of a plurality of the aligned flexion units in a further modified form.

The preferred means for changing the contour of an airfoil or other surface is illustrated in Figs. 1 to 6 and includes a plurality of aligned flexion elements or blocks 10, the individual blocks being shown in detail in Figs. 1 and 2. The blocks are desirably formed by die casting, each one comprising a base portion 11 having inwardly turned flange portions 12 on the lower surface thereof. There is further provided an integrally formed narrow upright portion 13 having an enlarged upper terminal 14.

A plurality of the blocks are supported together in alignment and in end to end relationship by means of a flat straight steel spring or tie rod 16 having a cross section of such dimensions as to closely fit within the opening formed by the flange portions 12 and the lower surface 17 of the base, the spring passing through and being supported within this opening.

The end walls 18 of the blocks are vertical and engage each other in end to end relationship when the spring is not under tension. Means are provided in the enlarged upper terminal portions 14 for securing uniform, predetermined separation of the blocks at their upper terminals, thereby causing the entire assembly to assume an arcuate position. The aforesaid means consist of a substantially oval shaped longitudinal aperture 20 in the terminal portion, the aperture having a reduced portion 21 at one end thereof, forming a shoulder 22. These apertures may be varied by making both round or oval, as the case may be. As will be noted in Fig. 5, the aperture 20 is substantially twice the length of the reduced portion 21.

A pin or plunger 25 is positioned in each reduced aperture 21, the pin having an oval shaped headed portion 26 of such size as to closely fit the aperture 20.

It will be noted that all pins are of the same length, which length is equal to the length of the blocks, and when the pins are not under pressure, as will be hereinafter described, each one is positioned wholly within its aperture as shown in Fig. 5, the forward end of one pin engaging the head of the next adjacent pin. When it is desired to flex the spring to produce a curved surface, the last pin, designated as 28, in the next to the last unit, designated as 27, is caused to move forward until the forward end of the head engages shoulder 29 in the aperture. Thus the forward end of the pin will have engaged the last section 29 causing a bending of the spring and further causing a separation between the upper terminals of the adjacent blocks 27 and 30. It will be noted that the head 32 of the pin in the block 33 adjacent to the block is somewhat shorter than the head on the pin 28, and that the heads on the pins become progressively shorter as they approach first block 34. Accordingly, the successive pins have a progressively increasing distance to travel before they reach their maximum forward position where the heads thereof engage their respective shoulders, and when the pin 35 in the first block 24 has been moved forward its entire length, its movement has caused all of the succeeding pins to move forward their maximum distance, thereby causing a uniform separation of the upper terminals of all of the units. The first pin 35 is shown as being engaged by a plunger 36 which may be actuated by any suitable means such as a hydraulic system or otherwise.

It will be readily appreciated that any predetermined curvature may be obtained by varying the precise dimensions of the pins and/or the apertures, as well as the length and height of the individual blocks. For instance, if a greater degree of curvature is desired at the forward end of the assembly, the head of the several pins may be shortened an appropriate amount. In the event that a greater degree of curvature is required in the forward end portion of the assembly than in the starting portion, the aligned apertures, instead of all being the same distance from the base, may become progressively closer thereto at the forward end. When the pressure on the first pin 35 is released, the spring 16 causes the individual blocks to assume their initial straight position.

The aforesaid construction is suitable for use in cases wherein the surface is normally flat. In the event, however, that it is desired to form a surface which is normally curved and occasionally made flat, the end walls of the blocks may be appropriately shaped and the spring bent to assume a normally curved position.

In the event that it is desired to provide a variable surface of considerable area, such as an airplane wing, a plurality of springs or tie rods carrying the blocks are suitably mounted in spaced relation and the flexible covering material, such as sheet metal, suitably secured thereto. In the event that one of the springs should break, it is desirable that the blocks be prevented from falling and accordingly short pins or rivets 37 may pass through aligned apertures 38 in the bases, the pins also passing through cut out portions 39 in the spring.

A modified embodiment of the flexion structure is shown in Figs. 7, 8 and 9, which structure is designed to permit a plurality of different curvatures in the surface. In this instance each block 42 is provided with flanges 43 in the lower surface of the base, an upright portion 44 provided with the aperture 45, and the enlarged oval portion 46 thereof adjacent to the upper end. There is also provided a second aperture 47 substantially midway between the upper and lower ends of the blocks, said aperture also having an enlarged oval portion 48.

The spring 49 is adapted to be flexed by the upper set of plungers 50 in the event that a moderate degree of curvature is required, and by the lower set of plungers 51 if a greater curvature is needed. In this instance also, the position of the shoulders 52 in the apertures remain constant and the length of the headed portions of the pins increases progressively. Thus it is apparent that one set of pins or the other may be actuated, depending upon the degree of curvature required.

In the event that only the trailing portion of the assembly may be required to assume the greater curvature, this portion only may be fitted with the lower set of plungers and this group of plungers be actuated by suitable means hereinafter described.

In Fig. 10 the individual units of the assembly are hinged together and are adapted to be returned to their normal position by elongated tensioning means secured to the last block. This structure includes a plurality of blocks 55 provided with cooperating hinge portions 56 at their lower ends through which transverse pins 57 pass. Each block is provided with an aperture 58 having a reduced portion 59 forming a shoulder 60.

Pins or plungers (not shown) are positioned in end to end relationship within these apertures as in the first embodiment, the pins causing the desired separation between the blocks. The blocks are retained in end to end engagement by means of a flat spring or other suitable member 63 which passes through and is supported in a recess or aperture 64 in the upper end of the block. The outer terminal of the spring is secured to the last block and the inner terminal to a suitable control mechanism (not shown) which permits the spring to pay out as the pins are moved outwardly, the spring being under tension after the pins have reached their farthest outward movement. Thus, when it is desired to return the blocks to their normal position, tension in the pins is released as the spring is drawn inwardly by the control mechanism.

In the foregoing embodiments the assembly is adapted to be flexed from a normal position to a curved position in one direction only. In Figs. 11 and 12 the structure is adapted to be curved in either of two directions. In this instance there is provided a plurality of blocks 67 provided with central apertures 68 through which a central round spring 69 passes.

The end portions of the blocks are bevelled on each side of the center line, as at 70, each side of the blocks having apertures 71 provided with reduced portions 72 forming shoulders 73. A pin 74 is positioned in each aperture, the forward end thereof being bevelled.

The flexion devices which have just been described have a variety of uses, and their use in varying the camber of both the lower and/or the upper surfaces of an airplane wing is next illustrated in the drawings. Fig. 13 is a diagrammatic view of an airplane wing 75 in perspective to illustrate the possible uses of the invention. In this instance the aileron sections 76 are shown as being capable of variation in curvature instead of merely being provided with the conventional pivotal action. This makes for far more effective operation of the airfoil.

The center section of the trailing edge designated as 77 is further provided with suitable means, hereinafter described more in detail, for variation of the camber within somewhat more restricted limits than the ailerons, means also being provided for moving the lower surface of the trailing edge downwardly independent of the upper edge which is highly desirable in landing, since by separating the trailing edges of the wing, a high order of suction is obtained. In taking off, a much higher degree of lift is desirable and accordingly, both upper and lower trailing edges are moved downwardly together.

Fig. 14 shows a plan view of the left-hand portion of a wing 78, a portion of the fuselage being shown at 79. The broken lines 80 indicate the relative positions of the aligned flexion units, the assembled units being spaced progressively further apart toward the tip of the wing. The aileron section 81 is also provided with the flexion structures in approximately the spaced position indicated by the broken lines 82.

A broken transverse section of a wing without the covering, constructed in accordance with the present invention, is illustrated in Fig. 15. This includes a plurality of spaced ribs 84 which are preferably cast, each of which are provided with flanges 85, a central opening 86 having flanged edges, and an extension portion 87 which extends rearwardly substantially two-thirds of the length of the flexion assembly. The rib is further provided with a plurality of triangular openings 88 through which the longitudinal spars 89 may pass.

The rib is formed with an upper and lower recess 90 substantially midway between the ends thereof where the forward end of each spring 91 is secured and a vertical flange portion 92 to which the first unit in each flexion assembly is secured. The flexion assembly is substantially twice the length of the distance from the recesses to the leading edge of the wing. In other words, only the forward one-third of the wing is rigid and the trailing two-thirds is variable in camber. The details of the preferred method of securing the elements to the rib are illustrated in Fig. 19. An angle support 93 is positioned on each side of the first flexion unit 94, one face thereof being secured to the unit and the other to the flange 92 by means of rivets 95. The flange 92 is provided with an aperture 96 through which actuating plunger 97 passes. The terminal of the spring 91 is secured to the upper surface of the horizontal flange 90 by means of rivets 98, a filler piece 99 being positioned above the spring in order to provide greater strength in the spring and also make the surface flush with the upper surface of the annular flange 85.

The wing covering 100 may be made of any desirable material and is secured to the wing sections in any suitable manner. The same method of affixing the elements may be followed in the lower surface. The individual units in both upper and lower surfaces, as well as the spring, are formed in such a manner as to normally assume the curvature shown in Fig. 15.

Adjacent to the last block 101 in the lower assembly a triangular trailing portion 101' is secured, which portion carries a substantially V shaped member 102 which extends along the entire trailing edge of the wing with the exception of the aileron sections. The upper portion 103 of the V shaped member extends further forward than the lower portion thereof and when the wing is in the position shown in Fig. 15, the upper surface of the portion 103 engages the lower surface of a triangular trailing portion 104 carried by the last block 105 in the upper flexion assembly.

The upper and lower trailing surfaces are connected together by one or more extensible members which are adapted to cause the lower surface to draw down the upper surface when a high order of lift is required, as in taking off, and to cause the upper surface to simultaneously raise the lower surface when the two surfaces are to be returned to their normal position. The extensible members include a female portion 108 pivotally secured at 108' to a block 109 in the lower assembly, and a male portion 110 pivotally secured at 110' to a block 111 in the upper assembly. The means for locking the male and female portions in either telescoped or extended position is shown in Fig. 18. The upper end of the female member is provided with an aperture 112 through which a pin 113 passes, the pin being supported in a housing 114 secured to the upper end of the member. The pin is urged inwardly by means of a compression spring 115 within the housing which engages a collar 116 carried by the pin. Two apertures 117 and 118 are formed in the male portion, one of which is aligned with the aperture 112 in the female portion when the portions are telescoped, as shown in Fig. 18, and the other of which is aligned therewith when the portions are extended.

When the wing is in its normal position, the pin resides in the apertures 112 and 117 and when the upper and lower surfaces are to be moved downwardly simultaneously, the pressure on the plunger 97 in the upper assembly is gradually released as the pressure upon the plungers in the lower assembly is applied. Thus, as the lower assembly is caused to move into its curved position, the extensible member, the portions of which are locked together, draw the upper surface down as well. Both surfaces may be raised by reversing the process. In the event, however, that the lower surface alone is to be lowered, for landing purposes wherein a maximum drag is required, the pin 113 in the extensible member is released, and thereby permitting the lower surface to move alone. When it is desired to return the surface to its normal position, pressure upon the lower plunger 97 is gradually released and the spring 93 draws the assembly upwards. Any suitable means may be employed for actuating the pin in the extensible member.

When the lower surface of the wing, either alone or in conjunction with the upper surface has been lowered by actuation of the plunger 97 in the lower assembly, the trailing section comprising substantially the last third of the variable surface, may be caused to assume a greater degree of curvature by employing the supplementary plungers of the type disclosed in Fig. 9. It will be noted that the block 121 in the lower assembly is provided with a slot 122 through which a control pin 123 is moveable. The details of the second set of plungers are not shown in Fig. 15 but they are identical with that shown in Fig. 9, the control pin 123 actuating the first plunger in lower group. This pin is adapted to be moved rearwardly by means of a control rod 125 connected at one end to the pin and at the opposite end it is supported in a pivotal element 126, the rod being moved rearwardly by a hydraulic member 127.

The following means are employed for affording support between the terminal portion 87 of the rib 84 and the central portion of the lower flexion assembly when the latter is in a lowered position. The lower edge of the terminal portion 87 is formed with a recess 130 having an aperture 131 through which a pin 132 passes, the pin having an integrally formed plate 133 at its lower end. Strap portions 133' are connected with adjacent sections 121 by means of pins 134. The upper end of the pin is formed with a longitudinal slot 135 in which a latch 137 is pivotally mounted at 138. The latch is provided with a slot 139 through which a pin 140 passes to limit its outward movement. A flat spring 141 urges the latch outwardly. Thus, as the lower flexion assembly is moved downwardly, the latch, after passing the aperture, moves outwardly, thereby securing the assembly against upward movement. Any suitable means (not shown) may be employed for releasing the latch when the lower surface of the wing is returned to its normal position.

As previously stated, the flexion assemblies are mounted in spaced relation and to this end longitudinal bars 144 are provided as shown in Fig. 21. The individual block or flexion unit 145 which engages a bar is provided with a base portion 146 having a recess for the spring 147 and outwardly extending flanges 148 which are suitably secured to the bar.

A section of an aileron portion is illustrated in Fig. 22, this section including upper and lower flexion assemblies 150 and 151, respectively, provided with suitable covering material 153. Inasmuch as the trailing edges of these sections are never separated in flight, the trailing edge is provided with a pair of curved plates 154 hinged together at 155. The plates are provided with slots 156 through which headed bolts 157 are mounted in the trailing portions 158. Thus, as the section is moved downwardly, the increased length of the upper surface is compensated for by the upper plate 154 moving rearwardly under the upper trailing section 158. The reverse action occurs when the section is moved upwardly beyond the normal position.

A suitable construction for the rudder and other moving sections is shown in Fig. 23, wherein the blocks 160 are formed with end walls 161 which taper inwardly from the center wherein they are pivotally connected at 162. They are further formed with apertures 163 on each side of the center and their movement is controlled by means of cables 164 passing through the apertures. The cables are secured at a dead end in the last section (not shown) and their movement on each side of the center is controlled by manipulating the cables.

In view of the fact that the wing is not of uniform width throughout its entire length, the length of the individual units in the several flexion assemblies will necessarily vary in order to permit a uniform downward movement of the entire surface which also may be made in several sections if desired.

What I claim is:

1. An airplane wing having a substantially flexible trailing section and means for varying the curvature of the upper and lower surfaces of said section, said means comprising a plurality of aligned units secured to the section in end to end relationship along one edge of each of said units, means for securing a predetermined separation of each of the units at their opposite edges to produce a curved surface in the section, means for returning the section to its normal plane and control means for lowering the lower surface of the section independently of the upper surface.

2. In a mechanical movement of the class described, a plurality of aligned units having non-parallel end walls pivotally joined together in end to end relationship substantially midway between the sides thereof and means disposed on each side of the center for securing a uniform separation of the adjacent walls of the units, said means comprising a plurality of headed pins carried within each unit on each side thereof, a pin in each unit being adapted to engage a pin in a forward unit.

3. In an airplane wing, a rigid leading section and a flexible trailing section and means for varying the curvature of the trailing section, said means comprising a plurality of spaced flexion assemblies supporting the trailing section and being supported at their forward ends on the rigid sections, each of the assemblies comprising a plurality of aligned units having a recess at one edge thereof, a flexible member passing through the recesses in the units and maintaining same normally in alignment, and means for securing a predetermined separation of the units at their opposite edges to produce a curvature in the assemblies.

4. In a mechanical movement of the class described, the combination of a plurality of substantially square units pivotally joined together substantially midway between the sides thereof and means disposed on each side of the center for securing a uniform separation of the adjacent walls of the units, said means comprising a plurality of headed pins carried within each unit on each side thereof, a pin in each unit being adapted to engage a pin in a forward unit.

5. In a mechanical movement of the class described, the combination of a plurality of substantially square units pivotally joined together substantially midway between the sides thereof, the units having aligned longitudinal apertures on each side thereof and a cable passing through each set of aligned apertures, the cables being fixed at one end of the structure, whereby when the cables are manipulated at their opposite ends the structure assumes a predetermined curvature.

6. An airplane wing comprising a substantially rigid section, a flexible section and means for varying the camber of the flexible section, said means including a plurality of spaced-apart, elongated, articulated structures, one surface of each structure being secured to the surface of said flexible section and one end of each structure being supported by the rigid section, each of such structures comprising a plurality of aligned, substantially rectangular units, an elongated spring upon which said units are mounted adjacent to one surface thereof and means for securing a predetermined separation of the undivided units along the opposite surface thereof.

7. In an airplane wing of the class described, the combination of a substantially rigid section and a flexible section, and means for varying the camber of the flexible section, said means comprising a plurality of transversely disposed articulated structures which are secured to the flexible section in spaced relationship, each of said structures comprising a plurality of aligned segments positioned in end to end relationship and means for producing a predetermined separation of the individual segments in each structure along one edge thereof to produce a predetermined curvature of the entire structure.

8. In an airplane wing of the class described, the combination of a substantially rigid section, a flexible section and means for varying the camber of the flexible section, said means comprising a plurality of transversely disposed articulated structures which are secured to the internal surface of the flexible section in spaced relationship, the inner terminal of each structure being secured to the rigid section, each of said structures comprising a plurality of aligned, interconnected segments positioned in end to end relationship and means for producing a predetermined separation of the individual segments in each structure along one edge thereof to produce a predetermined curvature of the entire elongated structure.

9. In an airplane wing of the class described, the combination of a substantially rigid section and a flexible section, and means for varying the camber of the flexible section, said means comprising a plurality of transversely disposed articulated structures which are secured to the flexible section in spaced relationship, each of said structures comprising a plurality of aligned segments positioned in end to end relationship and means for producing a predetermined separation of the individual segments in each structure along one edge thereof to produce a predetermined curvature of the entire structure, the segments having longitudinal apertures therein, the apertures being provided with enlarged portions at one end thereof, a headed pin positioned within each aperture, the forward end of each pin engaging the head of the pin in the adjacent segment.

10. In an airplane wing of the class described, the combination of a substantially rigid section, a flexible section and means for varying the camber of the flexible section, said means comprising a plurality of transversely disposed articulated structures which are secured to the internal surface of the flexible section in spaced relationship, the inner terminal of each structure being secured to the rigid section, each of said structures comprising a plurality of aligned, interconnected segments positioned in end to end relationship and means for producing a predetermined separation of the individual segments in each structure along one edge thereof to produce a predetermined curvature of the entire elongated structure, the segments having longitudinal apertures therein, the apertures being provided with enlarged portions at one end thereof, a headed pin positioned within each aperture, the forward end of each pin engaging the head of the pin in the adjacent segment, the lengths of the headed portions of the pins being increased progressively from the inner to the outer end of each structure.

11. In an airplane wing of the class described, the combination of a substantially rigid section, a flexible section and means for varying the camber of the flexible section, said means comprising a plurality of transversely disposed articulated structures which are secured to the internal surface of the flexible section in spaced relationship, the inner terminal of each structure being secured to the rigid section, each of said structures comprising a plurality of aligned, interconnected segments positioned in end to end relationship and means for producing a predetermined separation of the individual segments in each structure along one edge thereof to produce a predetermined curvature of the entire elongated structure, the segments having longitudinal apertures therein, the apertures being provided with enlarged portions at one end thereof, a headed pin positioned within each aperture, the forward end of each pin engaging the head of the pin in the adjacent segment, the lengths of the enlarged portions of the apertures being progressively decreased from the inner to the outer end of each structure.

12. In an airplane wing of the class described, the combination of a substantially rigid section and a flexible section, and means for varying the camber of the flexible section, said means comprising a plurality of transversely disposed articulated structures which are secured to the internal surface of the flexible section in spaced relationship, each of said structures comprising a plurality of aligned segments positioned in end to end relationship, each of the segments having a recess adjacent to one edge thereof, a spring passing through the recess in each segment and adapted to maintain the segments in alignment, and means for producing a predetermined separation of the individual segments along the opposite edges thereof to produce a predetermined curvature of the entire elongated structure.

ROBERT W. CONE.